Figure 5:
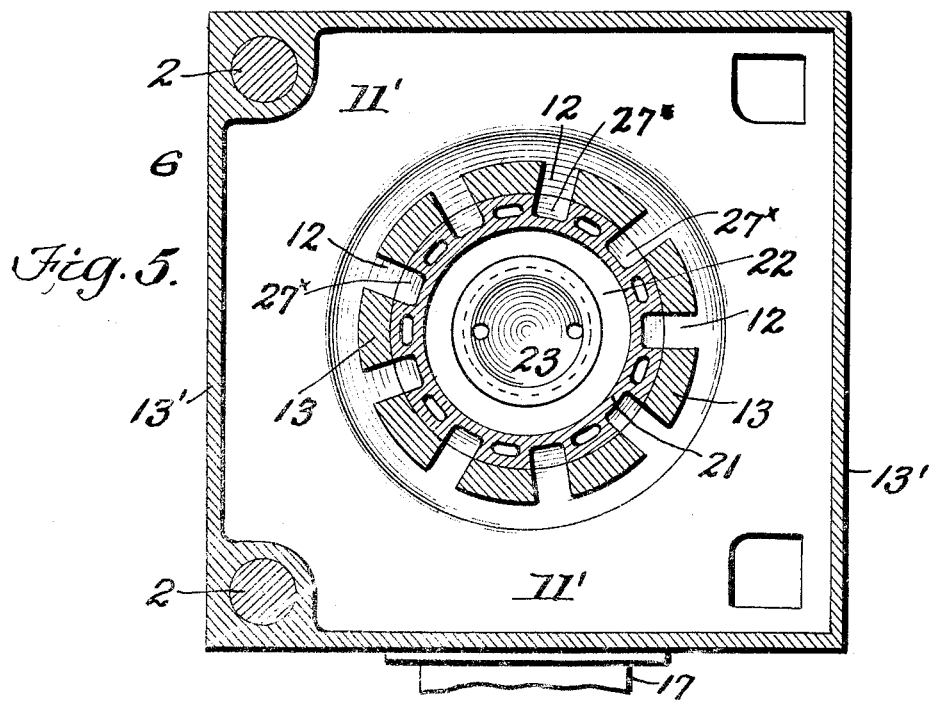

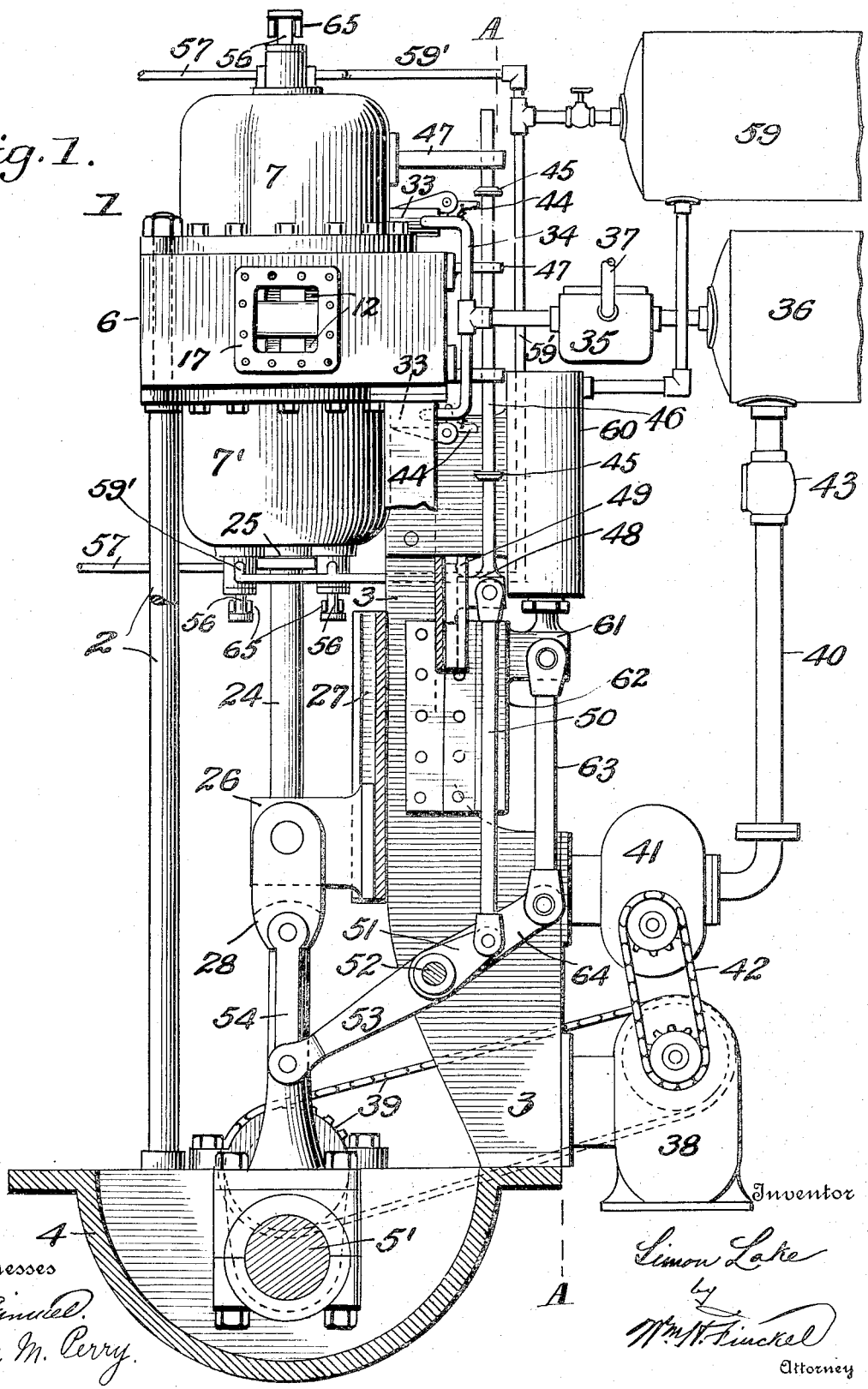

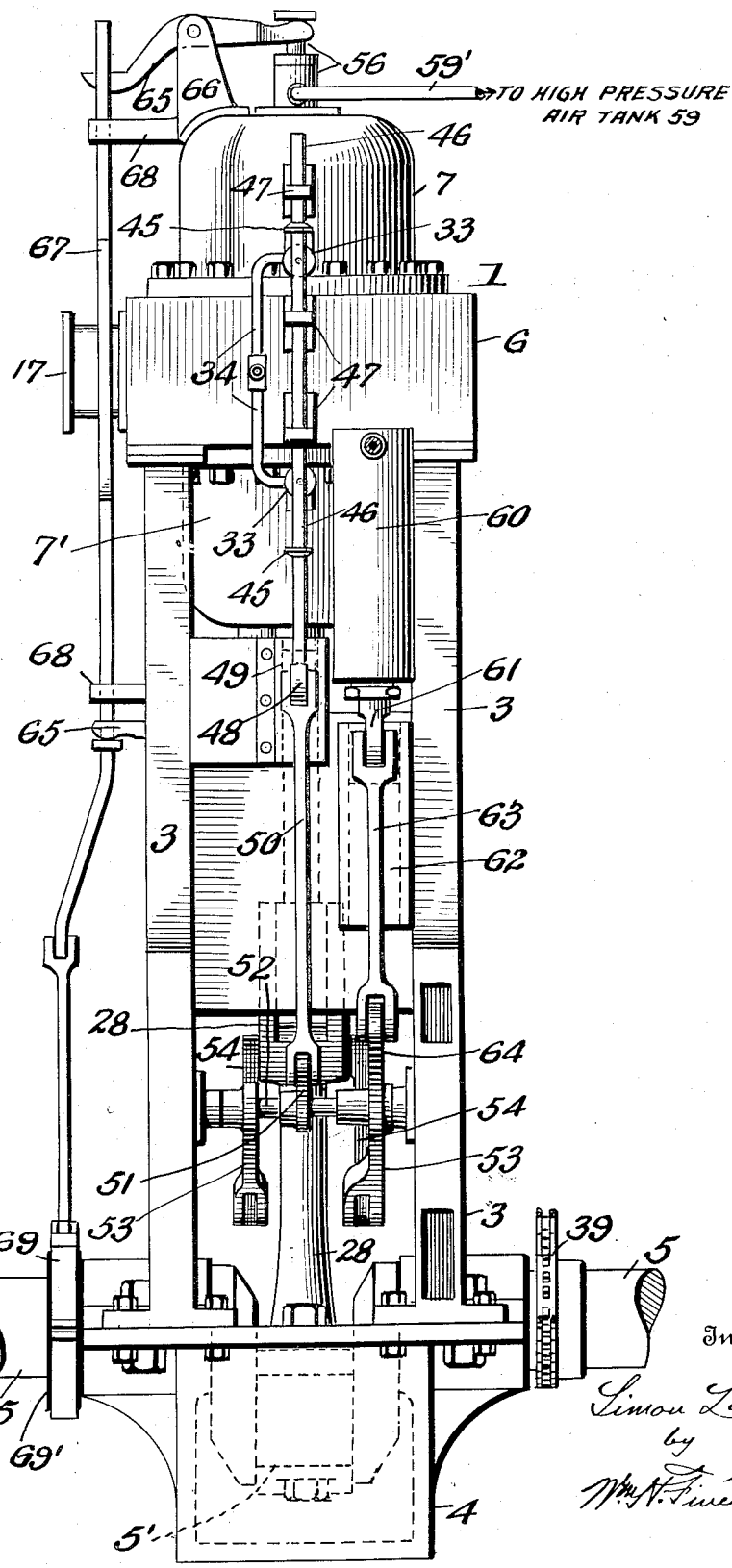

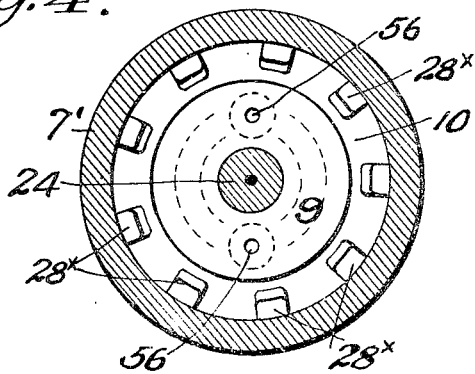

S. LAKE.
INTERNAL COMBUSTION ENGINE.
APPLICATION FILED NOV. 4, 1912.

1,128,463.

Patented Feb. 16, 1915.

5 SHEETS—SHEET 4.

Witnesses
E. M. Finckel
Lillie M. Perry

Inventor
Simon Lake
by
Wm. H. Finckel
Attorney

S. LAKE.
INTERNAL COMBUSTION ENGINE.
APPLICATION FILED NOV. 4, 1912.
1,128,463.
Patented Feb. 16, 1915.
5 SHEETS—SHEET 5.
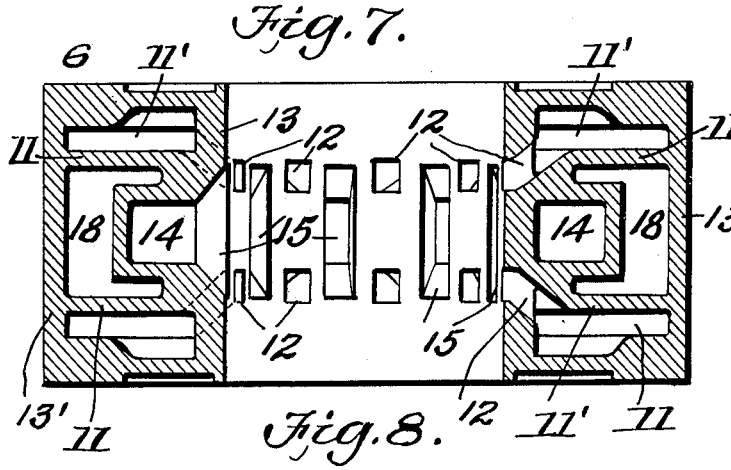
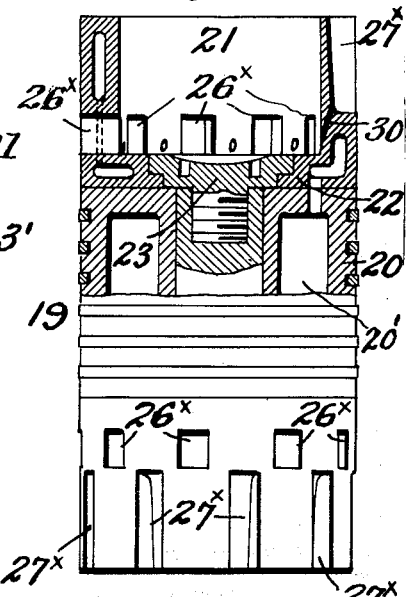
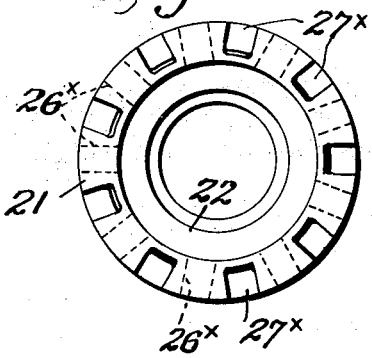
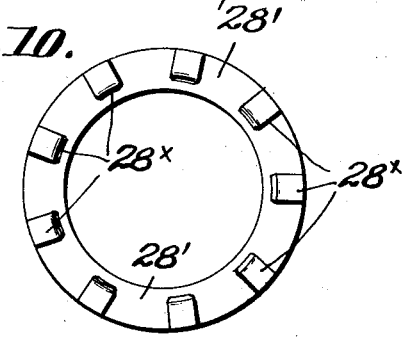
Witnesses
Inventor
Simon Lake
by
Wm. H. Finckel
Attorney

UNITED STATES PATENT OFFICE.

SIMON LAKE, OF MILFORD, CONNECTICUT.

INTERNAL-COMBUSTION ENGINE.

1,128,463. Specification of Letters Patent. Patented Feb. 16, 1915.

Application filed November 4, 1912. Serial No. 729,444.

*To all whom it may concern:*

Be it known that I, SIMON LAKE, a citizen of the United States, residing at Milford, in the county of New Haven and State of Connecticut, have invented certain new and useful Improvements in Internal-Combustion Engines, of which the following is a specification.

The invention relates particularly to certain improvements in the construction and method of operating that class of internal combustion engines shown and described in United States Letters Patent No. 1,026,871, granted to me May 21, 1912.

The object of my present invention is to provide for a more thorough scavenging of the power cylinder of the products of combustion, and for the injection of a charge of fresh air or a weak mixture of air and fuel under pressure into the cylinder at the beginning of the return or compression stroke of the piston, and for injecting an additional charge of fuel into the compressed charge whereby to ignite and burn the whole charge to drive the piston on its power stroke.

In high compression engines of the Diesel type, wherein the fuel is ignited by a high temperature of the air, due to compression, the fuel is not injected into the cylinder until the piston has reached the top of its compression stroke, and to insure a temperature sufficiently high to ignite the fuel it is necessary to have a very small combustion chamber in comparison with the types of engines wherein the fuel is injected along with the air on the suction stroke of the piston as is common with certain other types of internal combustion engines.

My invention combines the features of the above mentioned engines and enables me to secure a greater power per square inch of cylinder volume than is possible with either of the aforesaid types and which is due, first, to a better mixture of air and fuel than is possible to be had with the Diesel type of engine, and second, to a greater quantity of free air than is contained in a given size cylinder on the compression stroke of the piston.

The invention consists in the arrangement of the cylinder and piston to work on the usual two cycle principle with a pump to supply scavenging air for driving out the products of combustion from the cylinder after each power stroke of the piston, and the injection, under pressure, of a weak mixture of air and fuel into the power cylinder immediately after the exhaust ports and scavenging air inlet ports have been closed whereby to increase the volume of free air in the cylinder, the mixture being made weak so that it will not explode on compression, and finally in injecting an additional quantity of fuel into the highly compressed and heated initial charge which will ignite upon entering the combustion chamber and which will also ignite the weak mixture and thus drive the piston on its power stroke. The ignition having taken place causes the supplemental charge of fuel to burn as it is injected, in the same manner as in the high compression Diesel engine referred to. In other words, with my present construction the moment the piston closes the exhaust ports a volume of air, under pressure, which air is preferably charged with a quantity of fuel to provide a weak mixture which will not explode on compression, is admitted to the cylinder and compressed, and finally an additional charge of fuel is injected into the initial charge to enrich the latter and cause the whole to ignite and burn. In the engine of the patent above referred to there is injected, at one operation, a mixture that will ignite on high compression, but with that engine there could not be secured as high an initial compression or as thorough mixing of the air and fuel as can with the present method of injecting the fuel, without danger of pre-ignition.

The invention further consists in the peculiar construction and arrangement of the power cylinder and piston, and in certain other novel features of construction, combination and arrangement of parts as will be hereinafter fully described and then claimed.

Figure 6:
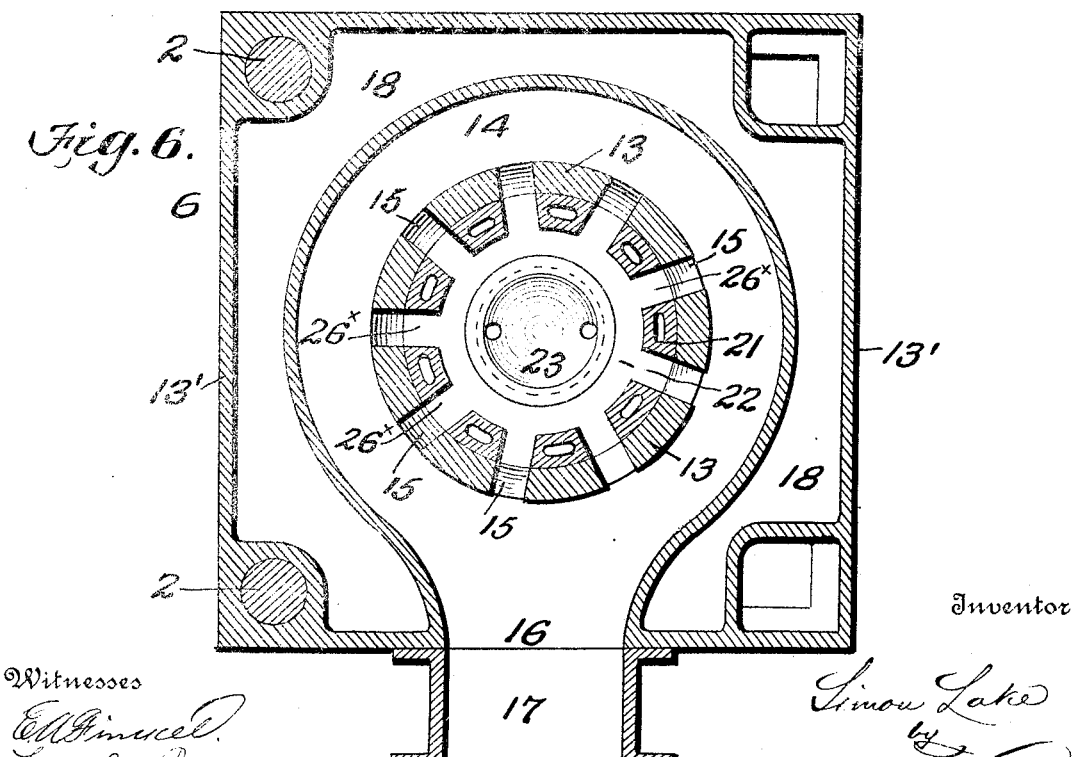

In the accompanying drawings, illustrating the invention, in the several figures of which like parts are similarly designated, Figure 1 is an end view partly in section of an engine embodying my invention. Fig. 2 is a vertical section drawn on the line A—A of Fig. 1. Fig. 3 is a vertical section on a larger scale drawn through the power cylinder and piston. Fig. 4 is a horizontal section drawn on the line B—B of Fig. 3, the piston being at the opposite end of the cylinder so as to illustrate the location of the fuel inlet valves controlling the admission of the supplemental charges of fuel to the lower end of the cylinder. Fig. 5 is a horizontal section drawn on the line C—C of Fig. 3. Fig. 6 is a similar view drawn on the line D—D of Fig. 3. Fig. 7 is a vertical section drawn through the central section of the cylinder illustrating the scavenging air inlet ports and the exhaust ports. Fig. 8 is a vertical section drawn through the lower head of the cylinder. Fig. 9 is a side view of one set of the filling pieces or fingers which are arranged in the cylinder heads and are designed to fit in and fill up the scavenging air pockets arranged in the walls of the piston extensions when the piston is at the end of its return or compression stroke. Fig. 10 is an end view of the same. Fig. 11 is a side elevation, partly in section, of the power piston. Fig. 12 is an end view of one of the tubular extensions carried by and at the ends of the piston.

The engine, as shown, is double acting, that is, each stroke is a power stroke, and the cylinder 1 thereof is mounted upon the upper ends of columns 2 and 3 extending from the base 4 in which is mounted, in the usual manner, the main or crank-shaft 5. The columns 3 are hollow for a purpose hereinafter appearing. The power cylinder 1 is constructed of three sections, an intermediate or central section 6 and an upper and lower cylindrical section 7 and 7', respectively, the said sections forming the heads of the cylinder and being constructed with double walls and ends to provide water jackets 8 for keeping them cool. The ends of the heads are formed with inwardly extending double-walled cylindrical sections 9 of less diameter than the bore of the cylinder to provide annular recesses 10 at the ends of the cylinder for a purpose hereinafter appearing. The spaces or jackets 9' between the wall of the sections 7 and 7' communicate with the water jackets of their respective heads. The central or intermediate section 6 is a hollow casting preferably rectangular in plan, and is constructed with a central bore which alines with the bore of the heads, the said heads being formed at their inner ends with outwardly extending flanges which are bolted to the said central section 6 to thereby hold the several sections of the cylinder securely together. Between its inner cylindrical wall 13 and its outer wall 13' the section 6 is divided by two horizontal partitions 11 to provide upper and lower scavenging air chambers 11', each of which communicates with one end of the cylinder through scavenging air inlet ports 12 arranged in and around the circular wall 13. Between the partitions 11 the section 6 is formed with an annular exhaust passage 14 which communicates with the cylinder through elongated exhaust ports 15 arranged in the wall 13 between the air inlet ports 12 as shown in Figs. 6 and 7. The exhaust passage 14 opens through one of the vertical walls 13' of the casting and the opening 16 is surrounded by a flanged collar 17 to which may be connected an exhaust pipe (not shown) for carrying off the exhaust gases. The exhaust passage 14 is partly surrounded by a water space 18 for keeping the casting cool. Cooling water is supplied to the jackets 8 of the heads 7 and 7' and to the jacket 18 of the casting 6 in the usual manner.

Working in the cylinder 1 is the power piston 19 which is constructed with a central water cooled section 20 to which is connected a piston rod 24 which works through a stuffing box 25 arranged in the lower head 7' of the cylinder. The lower end of the rod 24 carries a head 26 that works in guides 27 carried by a plate secured to the columns 3, and to the head 26 is connected the upper forked end of a connecting bar 28 the lower end of which is journaled to the crank 5' of the main shaft 5. To the ends of the central section 20 are connected tubular extensions or sleeves 21 the walls of which are of a thickness to snugly fit the annular recesses 10 at the ends of the cylinder and their inner ends are formed with inwardly extending stepped flanges 22 by which the said extensions are secured to the central section of the piston, the upper extension being held in place by a flange nut 23 which also serves to hold the piston to the piston rod 34, while the lower extension is held to the lower end of the piston by an annular flange or collar 25× formed on or secured to the said rod. Adjacent to its inner end each extension is formed with a plurality of exhaust ports or passages 26× which are designed to register with the elongated exhaust ports 15 in the wall 13 of the central section 6 and the periphery of each extension is formed with a plurality of recesses or pockets 27× which form air passages and which open into the respective ends of the cylinder in which the said extensions work. The recesses or pockets are designed to register with the scavenging air inlet ports 12 when the piston reaches the ends of its power strokes to permit the inlet of scavenging air to the opposite ends of the cylinder as will be hereinafter more fully described. As shown, the walls of the extensions 21, between the pockets and their base portions are formed with water spaces which communicate with the water space 20' of the piston 20. Water is admitted to the piston through its piston rod in the usual manner. In large engines I purpose to construct the extensions with water jackets. However, in smaller engines, I prefer to make the walls and their base sections solid and to construct the said sections of suitable refractory material.

In order to fill in the recesses or pockets 27ˣ when the piston reaches the end of each power stroke to reduce the capacity of the cylinder so that the air and fuel may be highly compressed, I arrange filling pieces or fingers 28ˣ in the upper and lower ends respectively of the upper and lower recesses 10 which are designed to snugly fit within the pockets 27ˣ to force the air that is trapped in the said pockets into the combustion chambers of the cylinder. When the piston nears the end of either compression stroke, and the outer end of either extension 21 enters its recess 10, and as the fingers enter their pockets 27ˣ, the air that has been trapped in the said recess and in the pockets will be forced therefrom into the adjacent combustion chamber through ports or passages 30 formed in the walls of the extensions 21 and which communicate with the inner ends of the pockets as shown in Figs. 3 and 11. By this construction it will be seen that the spaces within the extensions 21 form the combustion chambers of the cylinder and are considerably smaller than the diameter of the cylinder which thus permits of a more compact volume of air and consequently a better impregnation of the air on the injection of the fuel. When the piston is at the end of its power stroke the capacity of the chamber is proportionately increased owing to the extensions being entirely withdrawn from their recesses and the full diameter of the cylinder is disclosed which permits of a comparatively larger volume of fresh air being injected into the cylinder and combustion chamber when the piston commences its compression stroke and after the exhaust ports have been closed. The finger pieces are carried by rings 28' and each finger is securely held against displacement by screws 28" extended through the inner walls of the heads, the screws being threaded only in the fingers whereby they may be brought up tightly against the walls of the cylinder.

31 designates fuel inlet ports leading into the cylinder at points substantially midway between the scavenging air inlet ports 12 and the ends of the cylinder heads. These ports are controlled by inwardly opening valves 32 which work in valve casings 33 held in the walls of the heads and to each casing is connected an air and fuel supply pipe 34 which extends from a carbureter 35 to which is connected a compressed air supply tank 36 arranged adjacent to the engine. Fuel is fed to the carbureter from any suitable source of supply (not shown) through a pipe 37.

Scavenging air is supplied to the scavenging air chambers 11' in the central section 6 of the cylinder through one of the hollow columns 3 to the base of which is connected a suitable air pump 38, shown in the present illustration as a Roots blower, which is driven by the main shaft of the engine through a sprocket and chain gear 39. Compressed air is supplied to the tank 36 through a pipe 40 which extends from a suitable pump 41, shown also as a Roots blower, the intake of which is connected to the hollow column 3 to which the pump 38 is also connected. The pump 41 is geared direct to the pump 38 by chain and sprockets 42 as shown.

43 designates a check valve arranged in the pipe 40 to prevent back pressure from the tank 36.

The stems of the valves 32 extend through the outer ends of their casings 33 and are engaged by one end of elbow levers 44 (Fig. 3) which are pivoted between ears 44' formed integral with the casings 33. The levers are operated to unseat the valves by trip cams 45 carried by a vertically reciprocating bar 46 slidingly retained in brackets 47 extending from the cylinder 1. The lower end of the bar is formed with or connected to a slide head 48 which operates in guides 49 carried by one of the columns 3, and to this head is pivoted a connecting bar 50 the opposite or lower end of which is pivoted to a crank-arm 51 carried by a rock-shaft 52 mounted in suitable bearings secured to the columns 3. The shaft 52 is provided with arms 53 the free ends of which are connected by links 54 pivoted to the opposite sides of the forked end of the connecting rod 28 connecting the piston rod with the main shaft. By this arrangement it will be seen that as the main shaft is rotated motion will be imparted to the reciprocating rod 46 to thus alternately unseat the valves 32 to permit the inlet of a charge of fresh air and fuel into the cylinder after the exhaust ports and scavenging air inlet ports are closed as will be more fully set forth in the description of the operation of the engine. The elbow levers are normally held in engagement with the outer ends of the stems of the valves 32 by springs 55 which are connected to said levers and to the adjacent brackets 47. As the bar 46 is reciprocated the trip cams 45 will engage their coacting levers 44 to unseat their respective valves and will finally slip over the ends of the said levers to allow the valves to seat themselves and thus cut-off the supply of fuel and air to the cylinder and upon the return movement of the bar the cams will lift the levers against the tension of their springs 55 and pass by the levers without operating the valves, the springs then returning the levers to their operative position as will be readily understood.

So far as described the operation of the engine is as follows: When the piston reaches the end, we will say, of its down stroke the exhaust ports 26 will be first brought into register with the exhaust ports 15 allowing a portion of the spent gases to escape from the cylinder thus instantly reducing the pressure therein to atmospheric pressure. Immediately after the said exhaust ports are brought into register the air passages or pockets 27 in the extension 21 on the upper end of the piston will be caused to register with the scavenging air inlet ports 12 which allows the air in the upper scavenging air chamber 11' to rush into the upper end of the cylinder and this air will be directed upwardly toward the end of the cylinder against which it will strike and be deflected downwardly against the upper end of the piston to finally escape through the exhaust ports and thus drive out all the remaining products of combustion and leave the cylinder filled with fresh clean air at atmospheric pressure. Now as the piston begins its return or compression stroke the scavenging air inlet ports and the exhaust ports will be closed and at the moment of the closing of said ports the valve 32, controlling the admission of air and fuel to the upper end of the cylinder, will be opened to admit a weak charge of fuel and air into the cylinder, thus supplying it with an initial charge at a pressure considerably above that with which the cylinder was supplied when the exhaust ports were open, so that, by the time the piston reaches the end of its compression stroke, I have the advantage of not only thoroughly mixing the air and fuel after it has been injected into the cylinder, but I provide a pressure equal to that of the ordinary engine but in an ignition chamber of twice the size of that of the ordinary engine. The initial charge of fuel, however, is not made sufficiently rich to cause it either to explode or to ignite on compression, but it does become more susceptible to perfect combustion on being enriched by a small additional charge of fuel. During the operation above described, the pump 38 is constantly forcing air into the hollow column 3 and into the scavenging air chambers 11' and maintains a pressure therein at about four (4) pounds per square inch. At the same time the pump 41 is forcing air into the tank 36, drawing its supply from the hollow column 3, and maintaining a pressure in the said tank at about fifteen (15) pounds, more or less as desired. It will thus be apparent that as I force the fuel and air into the cylinder at the stated pressure after the exhaust ports are closed I have an initial compression of two atmospheres on the start of the compression stroke of the piston which gives me twice the volume of the combustion chamber of the ordinary engine for the same compression, the combustion chamber being twice as large as that of the ordinary engine.

In order to enrich the initial charge of fuel I arrange fuel inlet valves 56 at both ends of the cylinder opening directly into the combustion chambers. These valves are of the conventional oil spraying type and are connected to a suitable oil supply (not shown) through pipes 57. The oil is preferably forced into the highly compressed initial charge of fuel by compressed air which is supplied through pipes 59' from a compressed air supply tank 59, the air being supplied to the tank by a suitable air compressor 60, shown in the drawings as a two-stage compressor. The piston of the compressor is connected to or formed with a slide head 61 which operates in guides 62 extending from one of the columns 3, and to the head is connected a connecting rod 63 the lower end of which is pivoted to a crank arm 64 extending from the rock-shaft 52. The valves 56 are operated by levers 65 pivotally held in brackets 66 extending from the cylinder 1 and are operated by a reciprocating rod 67 slidingly retained in guides 68 extending from the engine. The rod 67 is connected to an eccentric strap 69 carried by an eccentric 69' mounted upon the main shaft 5. In the drawings I show only one valve 56 at the top of the cylinder located in the center of the head, but in the lower head owing to the piston rod 24 passing through it I arrange two valves 56, one on each side of the rod, in order to get a more even distribution, and consequently a better mixture of the fuel as the supplemental charges are injected into the cylinder.

Supplementing the brief description of the operation of the engine, it will be seen that at the moment the piston closes the inlet and exhaust ports the contents of the cylinder are at atmospheric pressure. I then admit fuel into the cylinder through port 31 at a pressure of about fifteen (15) pounds per square inch, the reciprocating rod 46, of course, being so geared as to open the valve 32 to admit the charge of air and fuel immediately after the said exhaust and scavenging air inlet ports are closed, so that at the beginning of the compression stroke of the piston I have the cylinder filled with an initial charge of two atmospheres and, therefore, when the piston arrives at the top of its stroke I have a combustion chamber of twice the size of that of the ordinary engine for the same compression. I also gain the advantage of thoroughly mixing the fuel and rendering it more susceptible to perfect combustion on being enriched by a small quantity of fuel which causes the mixture to instantly ignite and the supplemental charge to burn as it is injected into the combustion chamber. In other words, the fuel which is later injected into the cylinder is admitted into a gas and as a small amount only of liquid fuel is necessary in order to convert the charge into an ignitible mixture it can be better atomized and hence a more perfect combustion secured. At the same time I succeed in getting into the cylinder more than twice the amount of air over the same size cylinders of the high compression engines now in use. Furthermore, by my method of injecting an initial charge of air and fuel under pressure into the cylinder and then compressing the charge I am enabled to produce a much shorter engine since its cylinder and piston stroke are shortened thus particularly adapting the engine for marine uses. It may also be stated, that by arranging the initial fuel inlets 31 and their valves 32 in the side wall of the cylinder in such location that they are covered by the piston during the greater portion of its strokes they are protected against the initial force of the explosions, thus greatly lengthening the life of the valves and consequently reducing leakage and the necessity of often grinding them.

What I claim is:—

1. In a double acting internal combustion engine, a power cylinder having centrally disposed exhaust ports in its wall and scavenging air inlet ports arranged between said exhaust ports and opening, respectively, into the upper and lower ends of the power cylinder, a piston working in the cylinder controlling said ports, means to supply scavenging air under pressure to said inlet ports, fuel inlets arranged in the wall of the cylinder above and below said air inlet ports, valves controlling said inlets, means to supply fuel and air under pressure to said fuel inlets, supplemental fuel inlets arranged in the ends of the cylinder, valves controlling the latter inlets, and independent means for operating the valves, as specified.

2. In a double acting internal combustion engine, a power cylinder having centrally disposed elongated exhaust ports in its wall and scavenging air inlet ports arranged between said exhaust ports and opening respectively into the upper and lower ends of the cylinder, a power piston controlling said ports having cylindrical extensions on its ends each having a plurality of exhaust ports designed to register with said elongated exhaust ports and a plurality of pockets in their peripheries which are designed to register with the upper and lower scavenging air inlet ports, respectively, said pockets opening through the ends of their extensions, means to supply scavenging air to said air inlet ports, valves in the cylinder walls above and below said centrally arranged ports for supplying fuel to the combustion chambers of the cylinder, mechanism for operating said valves and supplementary fuel inlet valves arranged in the cylinder heads.

3. In a double acting internal combustion engine, a power cylinder having centrally disposed elongated exhaust ports in its wall and scavenging air inlet ports arranged between said exhaust ports which communicate with the upper and lower ends respectively of the cylinder, a scavenging air chamber formed on the cylinder with which said air inlet ports communicate, a power piston working in said cylinder controlling said ports, having a cylindrical extension on each end, each extension having a plurality of exhaust ports which are designed to register with said elongated exhaust ports and a plurality of pockets in its periphery which open into the upper and lower ends respectively of the power cylinder and which are designed to register with said air inlet ports as specified, fuel inlets arranged in the wall of the cylinder above and below said air inlet ports, valves controlling the said fuel inlets, means to supply fuel and air under pressure to said fuel inlets, supplemental fuel inlets arranged in the ends of the cylinder, valves controlling said supplemental fuel inlets, and means to supply fuel to the cylinder through said latter inlets.

4. In a double acting internal combustion engine, a power cylinder having annular recesses at its ends, centrally disposed exhaust ports in its wall and scavenging air inlet ports above and below the center of said exhaust ports which communicate respectively with the upper and lower ends of the cylinder, a power piston working in said cylinder controlling said ports, cylindrical extensions arranged on the ends of the piston having a plurality of exhaust ports adapted to register with the exhaust ports of the cylinder, each of said extensions having peripheral pockets that open through its outer end and which are adapted to register with said air inlet ports, as specified, a fuel inlet port arranged in the wall of the cylinder above and below said air inlet ports, valves controlling said fuel inlets, means to supply fuel and air thereto under pressure, valve controlled supplemental fuel inlets arranged in the ends of the cylinder, means to supply fuel thereto, and means to supply scavenging air under pressure to said scavenging air inlet ports.

5. In a double acting internal combustion engine, a power cylinder having annular recesses in its ends, centrally arranged elongated exhaust ports in its wall and scavenging air inlet ports above and below the center of said exhaust ports, a power piston working in said cylinder controlling said ports, cylindrical extensions arranged on the upper and lower ends of the piston having a plurality of exhaust ports adjacent to the inner ends thereof which are designed to register with said elongated exhaust ports, and a plurality of pockets in its periphery which open through the end of said extension and which are designed to register with the said scavenging air inlet ports, filling pieces arranged in the recesses at the ends of the cylinder adapted to enter said pockets when the piston reaches the ends of its power strokes, fuel oil inlets arranged in the wall of the cylinder communicating with each end of the cylinder, valves controlling said inlets, supplemental fuel oil inlets arranged in the ends of the cylinder and valves controlling said inlets, and independent means for operating said valves, as specified.

6. In a double acting internal combustion engine, a power cylinder constructed of a central hollow section having a plurality of elongated centrally disposed exhaust ports in its inner wall and a plurality of scavenging air inlet ports arranged between the exhaust ports and above and below the center of said exhaust ports, scavenging air chambers arranged in the upper and lower ends of said section communicating respectively with the upper and lower air inlet ports and an exhaust chamber which communicates with said exhaust ports, heads arranged on the upper and lower ends of said central section, each having an inwardly extending section projecting into the bore of its head and of less diameter than the bore providing an annular recess at each end of the cylinder, a power piston working in the cylinder having a cylindrical extension on each end, each extension having a plurality of exhaust ports which are adapted to register with said exhaust ports of the cylinder and a plurality of pockets in its periphery which are adapted to register with said scavenging air inlet ports in the respective ends of the cylinder, fuel inlets in the walls of the cylinder, supplemental fuel inlets in the ends of the cylinder, valves controlling said inlets, and independent means for operating said valves as specified.

7. In a double acting internal combustion engine, a power cylinder having a plurality of centrally disposed exhaust ports in its wall and scavenging air inlet ports arranged between said exhaust ports and above and below the center thereof whereby to open into the respective ends of the cylinder, a power piston working in the cylinder controlling said ports, having a cylindrical extension on each end, each said extension having a plurality of exhaust ports adjacent to its inner end which are designed to register with said exhaust ports of the cylinder and a plurality of pockets which are designed to register with the air inlet ports at the respective ends of the cylinder, valve controlled fuel inlets arranged in the wall of the cylinder above and below said air inlets, a fuel supply connected to said inlets, an air supply connected to said fuel supply, means operable by the engine for supplying air under pressure to said air supply, means operable by the engine for supplying scavenging air under pressure to said scavenging air inlet ports, supplemental fuel inlets extending into the ends of the cylinder, a fuel supply therefor, valves controlling said inlets, means operable by the engine for supplying high pressure air to said supplemental fuel supply to force the fuel into said cylinder, and independent means for operating said fuel inlet controlling valves as specified.

8. An internal combustion engine, comprising a base, a power shaft mounted therein, hollow columns extending from said base, a power cylinder mounted upon the upper ends of said hollow columns, said cylinder having a plurality of exhaust ports in its wall and a plurality of scavenging air inlets arranged between said exhaust ports, a scavenging air chamber communicating with said air inlet ports and with one of the said hollow columns, a pump geared to the power shaft of the engine for supplying scavenging air to said column and to said air chamber, a fuel inlet arranged in the wall of the cylinder above said air inlets, a fuel supply connected to said inlet, a compressed air supply tank connected to said fuel supply, a pump having its intake connected to the hollow column with which the first mentioned pump is connected for forcing air under pressure into said compressed air supply tank, a supplemental fuel inlet leading into the end of the cylinder, a high pressure tank connected to said fuel supply, means for supplying air to said high pressure tank, valves controlling the admission of the fuel to the cylinder, as specified, independent means for operating the valves, and a power piston working in said cylinder controlling said exhaust ports and said scavenging air inlet ports.

In testimony whereof I have hereunto set my hand this 17th day of October, A. D. 1912.

SIMON LAKE.

Witnesses:
 M. D. BLONDEL,
 C. E. ADAMS.